Figure 1:
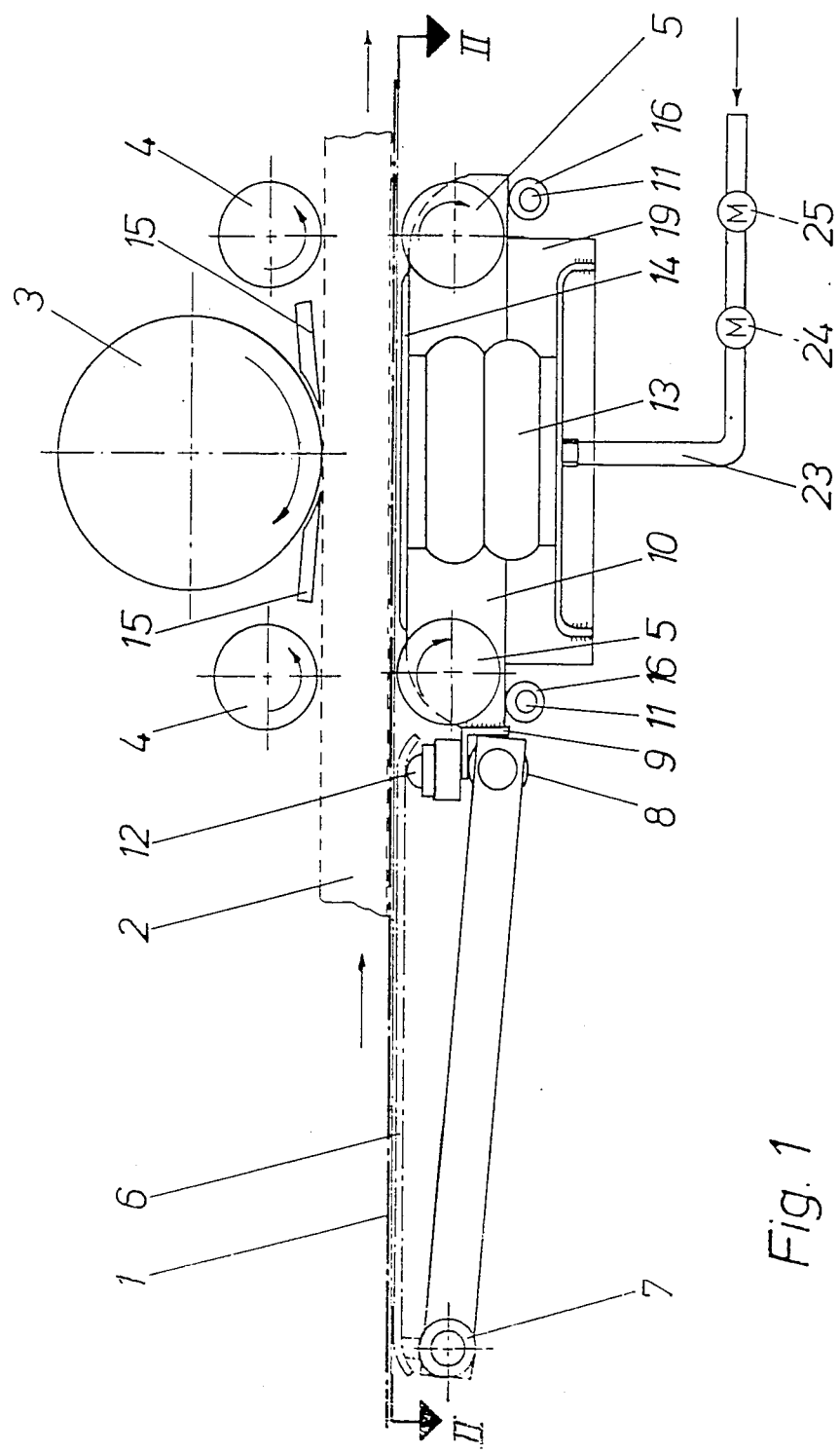

United States Patent [19]

Holst et al.

[11] Patent Number: 4,679,354
[45] Date of Patent: Jul. 14, 1987

[54] GRINDING MACHINE FOR GRINDING OR RASPING OF RUBBER ITEMS

[75] Inventors: Svend Holst, Tarm; Niels Jensen, Hemmet; Georg Jensen, Skjern, all of Denmark

[73] Assignee: B & J Rocket Rasp A/S, Tarm, Denmark

[21] Appl. No.: 888,275

[22] Filed: Jul. 22, 1986

Related U.S. Application Data

[63] Continuation of Ser. No. 747,056, Jun. 20, 1985, abandoned.

[51] Int. Cl.⁴ ............................................. B24B 7/00
[52] U.S. Cl. .................................. 51/76 R; 51/74 R
[58] Field of Search ............... 51/74 R, 76 R, 215 E, 51/215 R, 38, 61, 138

[56] References Cited

U.S. PATENT DOCUMENTS

| | | | |
|---|---|---|---|
| 2,199,135 | 4/1940 | Johnston | 51/74 R |
| 2,284,557 | 5/1942 | Brackett | 51/138 |
| 2,441,108 | 4/1948 | Turner | |
| 3,648,415 | 3/1972 | Bair | |
| 4,258,506 | 3/1981 | Robinson | 51/138 X |
| 4,416,090 | 11/1983 | Jonasson | 51/138 |

FOREIGN PATENT DOCUMENTS 1172844  6/1964  Fed. Rep. of Germany .

Primary Examiner—Frederick R. Schmidt
Assistant Examiner—Maurina Rachuba
Attorney, Agent, or Firm—Merchant, Gould, Smith, Edell, Welter & Schmidt

[57] ABSTRACT

A grinding machine for the grinding or rasping of rubber items having a conveyor belt (1) which feeds the rubber items in under a grinding cylinder (3). Under the conveyor belt (1) in the area under the grinding cylinder (3), at a distance from and freely moveable—within determined limits—there is mounted a support surface (14) which seeks to press the surface (14) in the direction towards the grinding cylinder (3). The support can be, for example, of one or more bellows cylinders (13) which provide central support for the surface (14). The pressure in the bellows cylinder is formed by compressed air from a compressed-air pipe (23) with a substantially constant pressure. Under the conveyor belt a pivotably mounted (7) guide plate (6) is provided, the one side of which is linked to the support surface (14) via a hemispherical surface (12), which, via a strap or an angle piece (9), is secured to the support surface (14).

6 Claims, 3 Drawing Figures

GRINDING MACHINE FOR GRINDING OR RASPING OF RUBBER ITEMS

This is a continuation of patent application Ser. No. 747,056 filed June 20, 1985 now abandoned.

This invention relates to a grinding machine for the grinding or rasping of rubber items, and of the type presented in the preamble to claim 1.

Rubber is one of the most difficult materials to grind or rasp, the reason being that the material's elastic and yielding characteristics make it difficult to grind accurately. Either too much or too little is ground off and the grinding process has to be repeated. Therefore, to a wide extent, the grinding of rubber is avoided.

There are, however, certain technical areas in which one cannot avoid the grinding or rasping of rubber items. For example, rubber which is to be glued or vulcanized to another item can have both a completely rough surface to which the glue or the vulcanizing medium or the like can get a grip. In the retreading of rubber tires for vehicles, one first rasps and cleans the tire which is to be provided with a new tread, after which a suitable piece of rubber with a new tread is applied, for example by means of an adhesive mass which is heat-treated so that the items can be vulcanized together. The cleaning and preparation of the back of the rubber item with the tread is a difficult operation which demands a great deal of care, the reason being that the quality of this preparation is the whole basis for whether or not a sufficiently good retreading is achieved.

Rubber items with tread designs are delivered in long lengths, for example of 3-15 m, from which suitable pieces are cut. The rubber items are moulded using a special moulding process, and in order to ensure that the items come free of the mould, different kinds of slip solutions can be used. The back of the rubber item, i.e. the side which is to be vulcanized to the prepared tire, can be quite smooth, partly due to the method of moulding and partly due to the slip medium. Such a surface cannot be used directly, neither for gluing nor vulcanizing. The surface has to be cleaned and made rough, for example by grinding or rasping.

In carrying out this grinding or rasping, two demands must be taken into consideration. Firstly, the whole surface has to be ground clean, which is difficult because it is not necessarily completely flat. Secondly, one must not remove too much material but only a quite thin layer, which is even more difficult because the prepared rubber items do not have a completely even and uniform thickness. The known machines on the market, which are at present used for the preparation of rubber items of said kind, work almost as a type of planing and thicknessing machine. They remove too much material in order to be able to ensure that the first demand regarding sufficient clean grinding is fulfilled.

A machine is known from German publication no. 1.172.844 for the grinding or rasping of non-vulcanized rubber items for new tires for vehicles, said rubber items having to be mounted on and vulcanized fast to ready built-up carcases, whereby the manufacture of new tires for vehicles is achieved. The machine is specially arranged to grind clean the back of non-vulcanized rubber items with very great variations in thickness along the item's breadth, because the items comprise both the quite thick tread part and the many times thinner tire sides.

For this purpose the apparatus has a rotating wire brush cylinder and yielding counter-hold consisting of a series of disks. These disks can yield individually so that they can adjust themselves in accordance with the thickness of the item. In order to be able to achieve a uniform rasping, it has thus been necessary to use a complicated counter-holder construction. This gives rise to problems with the start and finish of the rasping of the item, the reason being that the item is not precisely supported or there is no precise feeding and feed rate of the item.

The object of the invention is to provide a grinding machine of the kind presented in the preamble to claim 1, whereby a sufficient cleaning and preparation of the item is always achieved, but where on the other hand there is never removed too much material. Moreover, a well-defined support of the item is desirable, so that the start and the finish of the grinding of the rubber item is also of the same quality as the grinding of the rest of the item.

This is achieved by constructing the grinding machine according to the invention as presented and characterized in claim 1. The support surface hereby achieved for the item is such that it presses the item against the grinding aggregate with a suitable pressure, and in such a manner that the surface and thus the item can rock or tilt slightly and hereby compensate for the difference in thickness in the rubber item prepared with the tread design. The grinding process thus achieved is one where the item almost floats or glides—though while still supported—while it is fed towards the grinding aggregate. The result is that a uniform, thin layer of rubber is removed in a quick and efficient manner, and without too much material being removed, because the conveyor supports the item and ensures that it is fed past the grinding aggregate at a desired speed so that it is ground correctly.

By designing the grinding machine according to the invention as presented and characterized in claim 2, a simple construction is achieved without an excess of mechanics or regulating equipment. One can, however, achieve the same effect by supporting the surface with, for example, four spring elements, one in each corner, four hydraulic or pneumatic cylinders with pistons, rubber blocks or similar elastic elements, but it has proved to be of advantage from the view of adjustment technique to use a bellows cylinder with compressed air, as further presented and characterized in claim 3, in that it is possible to adjust the pressure depending on whether the rubber item to be ground is soft or hard. One has thus two possibilities of adjustment when grinding, i.e. one can determine the speed at which the rubber item is fed under the grinding roller, and one can determine the pressure with which the rubber item is pressed against the grinding roller.

If the grinding machine according to the invention is constructed as presented and characterized in claim 4, a very precise regulation of the pressure in the bellows cylinder can be achieved, the result being that the machine sustains its completely uniform working of the rubber items.

By constructing the grinding machine according to the invention as presented in claim 5, fixed limits are achieved for the movement of the support surface which, for example, cannot be fed upwards and reach the actual grinding aggregate. Furthermore, the limited freedom of movement for the support surface still provides sufficient free movement to allow rubber items with varying thicknesses to be machined. Thus the support surface does not need to be set at a distance from the grinding aggregate which corresponds precisely to the thickness of the rubber item, the reason being that variations herein are compensated for automatically.

If the grinding machine is constructed as characterized in claim 6, a reasonably noiseless and elastic function of the support surface is achieved.

If the grinding machine is constructed as presented in claim 7, one can quickly and easily set the machine for the working of items of different thicknesses.

If the grinding machine according to the invention is constructed as characterized in claim 8, a very even feeding-in of the rubber items is achieved, and thus problems with the conveying of new rubber items to the grinding machine are avoided.

Finally, if the grinding machine according to the invention is constructed as presented in claim 9, a uniform grinding of the rubber item from edge to edge is achieved, the reason being that it is completely avoided that the grinding aggregate attacks the front edge or the rear edge of the item to be ground. Moreover, the guide rails ensure that it is not too large an area of the grinding aggregate which is in contact with the item, and thus that the tangential influence on the rubber item does not become too violent.

Figure 2:
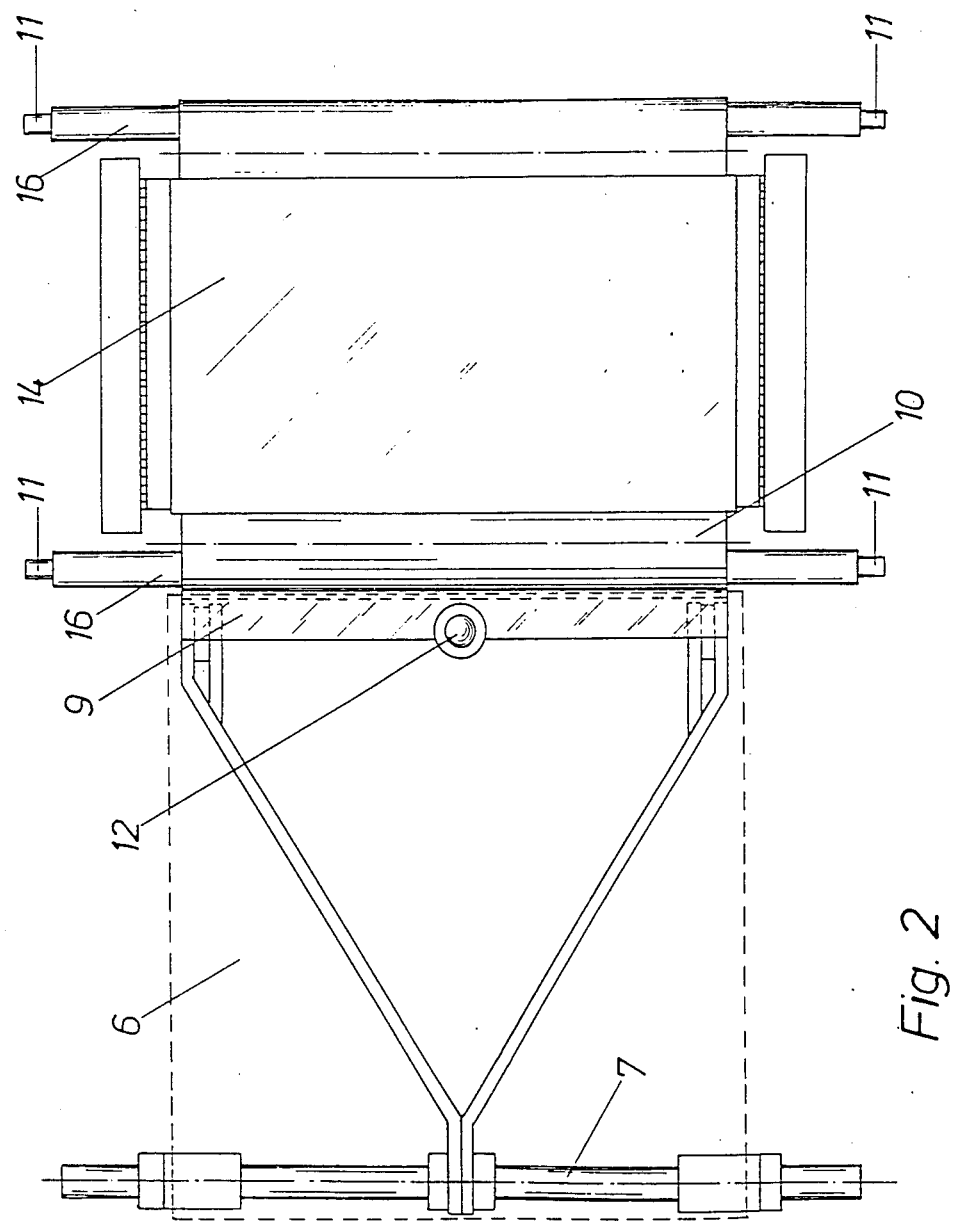
Figure 3:
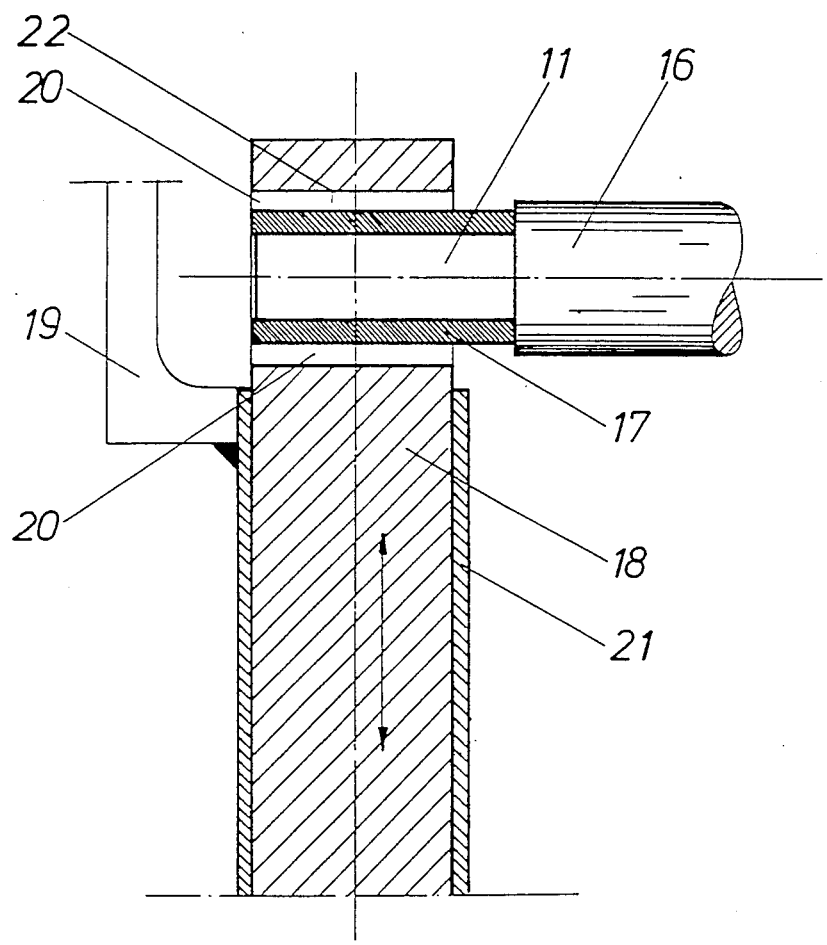

The invention will now be described in more detail with reference to the drawing, which shows a preferred embodiment of the invention, where FIG. 1 shows, in the form of a principle diagram, the grinding machine according to the invention seen from the side, FIG. 2 shows a part of the same machine as in FIG. 1, but seen from above in the direction II—II in FIG. 1, and FIG. 3 shows adjustment and suspension elements for the support surface.

In the drawing, 3 indicates a grinding wheel, a grinding cylinder or a grinding roller, or in the form of an iron cylinder with low carbon content and having copper-soldered tungsten grain or other abrasive grit on the surface. The grinding roller 3 rotates, for example in the direction shown by the arrow. A rubber item 2, for example a piece of tread rubber with the tread design facing downwards, is fed in under the grinding roller. The item 2 can be fed in on a conveyor belt 1, which moves in the direction shown by the arrow. For the feeding and counter-holding of the rubber item, two guide rollers 4 with the same direction of rotation as shown are mounted above the item, and two wheels 5, which support the conveyor belt, are mounted under the conveyor. In order to ensure that the grinding roller 3 does not grind or machine the item 2 until it is correctly in place under the grinding roller, one or more guide rails 15 are used, these having an extension which is at least the same size as the grinding roller, and which as shown in the drawing's FIG. 1 are knifelike associated with the roller 3. Under the conveyor belt 1 there is disposed a support surface 14, for example in the form of a smooth metal plate, on which the conveyor belt slides. The support surface is supported in a substantially central manner by a bellows cylinder 13, this being supplied with compressed air via a pipe 23. The air pressure is regulated via two pressure-regulating manometers 24 and 25, in that the one manometer 25 provides a coarse regulation of the air pressure, and the next manometer in the direction of the air flow effects fine regulation of the air pressure.

The support surface 14, which is seen in both FIG. 1 and 2, is mounted on an under-support 10 which is secured to transverse bearing arms or axles 16. The bearing arms or the axles 16 are terminated at each end by axle journals 11. In FIG. 3 it will be seen in more detail how an axle journal 11 is suspended in an adjustable machine part 18, which comprises an adjustable support surface holder. The holder 18 can be displaced in a vertical direction as shown by the double arrow, for example in a sleeve 21 or the like. The sleeve 21 is secured to the actual machine chassis 19. The holder 18 can be displaced and be arranged in different ways, for example so that it comprises a part of a ball spindle, or similar spindle, which is displaced by the turning of underlying nuts, gear-wheels or other elements, none of which are shown. Preferably, the grinding machine is constructed in such a way that all four supporting elements 18 are adjusted at the same time and by an equal amount. By raising or lowering the supporting elements 18, the support surface 14 is raised or lowered. The axle journals 11 are engaged with a bush 22, but in such a way that there is a certain area of tolerance 20 between the axle journal 11 and the limiting wall of the bush. A part of this area 20 can be filled out with a rubber bush 17 on the axle journal 11, or by a rubber bush placed in the bush 22. However, the axle journal has a certain freedom of movement, in that it is free to move in the area 20, the size of which is in the order of several mm (see the following explanation of the machine's function).

If the machine is without rubber items 2, i.e. in the idling condition, the support surface will be pressed upwards by the bellows cylinder 13 just as much as allowed by the area of tolerance 20. The support surface 14, and herewith the conveyor belt 1 extended above it, will thus be in its upper position, depending on the position of the adjustment element 18. If a rubber item 2 is now introduced into the grinding machine, the support surface 14, which is resting on the bellows cylinder 13, will rock or tilt depending on how precisely the rubber item fills out the space between the grinding roller 3 and the support surface 14. The support surface will thus exercise the same pressure on the rubber item, regardless of how uneven this may be, providing that the unevenness and inaccuracies in the rubber item lie within the size of the area of tolerance 20. Therefore, the effect is not that of a planing and thicknessing machine or thickness grinder, as is the case with the known grinding equipment, but of a grinding machine which provides a uniform working of the rubber surface, without removing too much material.

In order to ensure that the support surface 14 tilts and adjusts itself to the rubber item 2 already before this reaches in under the grinding wheel 3, a guide plate 6 can be disposed under the conveyor belt in front of the support surface. The guide plate can be mounted in a hinged manner on a spindle 7, said spindle being secured in a manner not shown to the chassis of the machine. From the spindle 7, an arm or a beam can extend to a pivot joint 8, which via a strap plate or angle piece 9 is fastened to the machine part 10, which follows the movement of the support surface. On the strap 9 can be mounted a support ball or hemispherical support of metal 12, upon which rests the guide plate 6. When the guide plate 6 is pressed slightly downwards by the weight of a rubber item 2, this can make the support surface 14 tilt slightly, the result being that its left-hand edge in FIG. 1 is lowered a little, so that the rubber item is more easily fed in under the grinding wheel 3.

The grinding wheel or roller 3 is, for example, 400 mm in breadth, so that even the broadest rubber items for the retreading of vehicle tires can be machined. Rubber items of this type have a thickness of 10-35 mm and a breadth of 150-360 mm. With the machine according to the invention it is possible to grind a rubber item clean in one operation. It is possible, however, to arrange several grinding machines according to the invention after one another on the same conveyor belt, thus enabling, for example, both coarse grinding and fine grinding at the same time. The pressure in the bellows cylinder 13 must be in the region of 0.4-1.0 bar. The area of tolerance 20 is preferably in the order of 3 mm on each side of the axle journal 11, so that the adjustment of the adjustment element 18 is the thickness of the rubber item ±3 mm. If, for example, the grinding machine has been adjusted for the working of rubber items of 12 mm, the machine can thus process the item with the tolerance 12±3 mm, i.e. items with a thickness of 9-15 mm. Consequently, it is not even necessary to change the adjustment if, in between, it is required to grind a rubber item of, for example, 10 mm, providing that this item does not have parts which are not within the area of tolerance.

The preferred embodiment shown in FIG. 1 can, in fact, be turned over. The support surface 14 will thus be uppermost and the grinding aggregate 3 at the bottom. The desired result is still achieved in that the rubber item 2 is now fed in with the tread design facing upwards. The support surface 14 with guide plate 6 will still adjust the pressure of the rubber item against the grinding aggregate depending on the item 2's thickness etc.

It will be obvious to those with a knowledge of the art that the grinding machine according to the invention functions as intended with all forms of grinding aggregates such as grinding rollers, grinding wheels, grinding belts, grinding disks on spindles etc.

We claim:

1. A grinding machine for surface roughening a rubber workpiece for retreading of rubber tires comprising: support means for holding the workpiece, and grinding element, said support means including,
   (a) a flat support surface,
   (b) means for supporting said support surface in a manner which makes it free to tilt in all directions, including:
      (1) a pair of transverse bearing arms floatably supporting said support surface within predetermined limits so that said surface is relatively free to yield in response to variations in thickness of the workpiece,
      (2) upward bias means including a bellow engaging said support surface and generally centered between said arms and having its central axis generally in line with the center of the support surface, said bias means being independently controllable to urge the workpiece into engagement with said grinding element, said arms include journals and said support surface includes apertures sized substantially larger than said journals to receive said journals in loose engagement to accomodate the free tilting of the surface, and
   (c) a conveyor belt situated atop said support surface for conveying the workpiece into engagement with said grinding element, said bellows having a top surface in contact with said support surface and wherein the periphery of said top surface is distant from the peripheral edges of said support surface, so that said support surface is free to tilt in all directions in response to variations in the workpiece.

2. A grinding machine according to claim 1 wherein said bias means includes a bellows having its central axis generally in line with the center of the support surface.

3. A grinding machine in accordance with claim 1 wherein said journals include rubber bushings which together with said journals are in loose engagement with said support surface.

4. A grinding machine according to claim 3 wherein said support surface includes a vertically adjustable holder.

5. A grinding machine according to claim 1 further including a pivotably mounted guide plate, one end of which is adjacent said support surface and which is disposed under said conveyor belt, said pivotal plate being supported at its adjacent end by a centrally located ball.

6. A grinding machine according to claim 5 further including a knife shaped guide rail located adjacent the grinding element along the entire length thereof.

* * * * *